July 17, 1951
J. M. POWERS
2,561,226
METHOD OF POLYMERIZING OLEFINS AT
SUBATMOSPHERIC TEMPERATURES
Filed Nov. 18, 1948
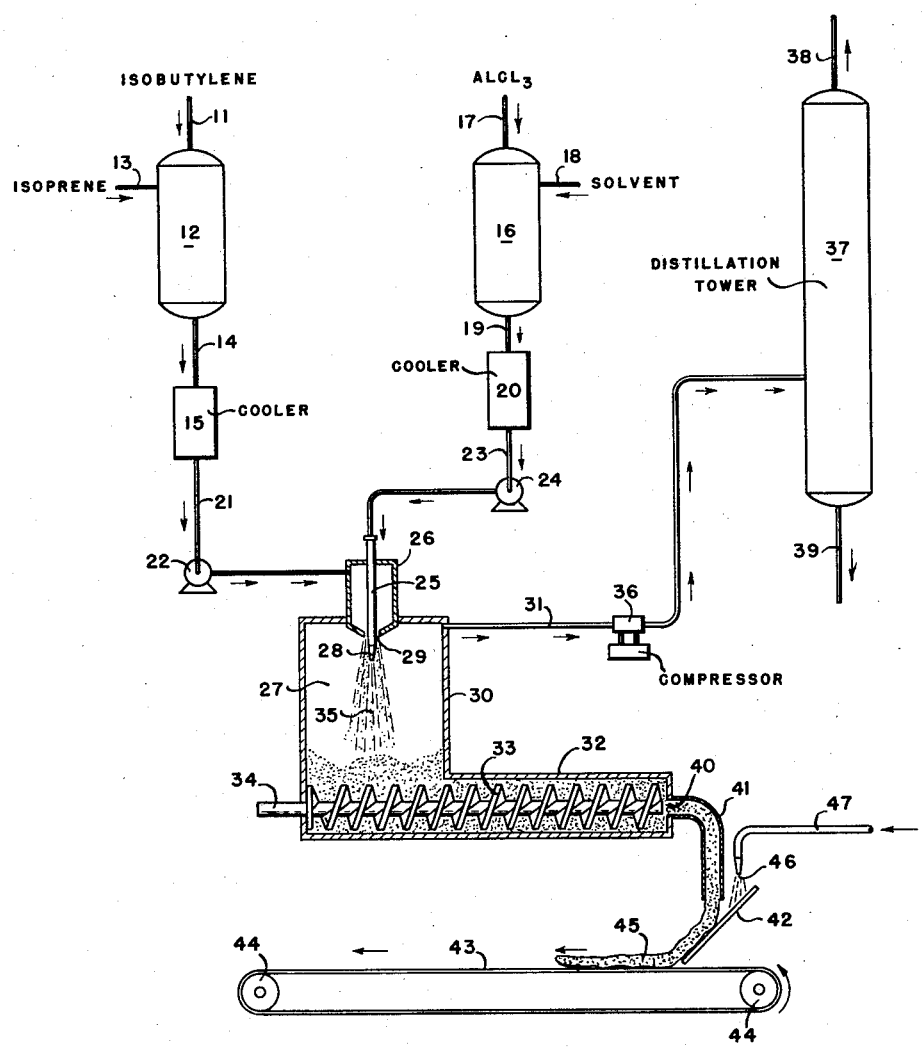
John M. Powers, INVENTOR.
BY
AGENT.

Patented July 17, 1951

2,561,226

UNITED STATES PATENT OFFICE 2,561,226

METHOD OF POLYMERIZING OLEFINS AT SUBATMOSPHERIC TEMPERATURES

John M. Powers, Baytown, Tex., assignor, by mesne assignments, to Standard Oil Development Company, Elizabeth, N. J., a corporation of Delaware Application November 18, 1948, Serial No. 60,774

8 Claims. (Cl. 260—85.3)

1

The present invention is directed to a method for polymerizing olefins to produce polymers having rubbery characteristics. More particularly, the invention is directed to the production of rubbery polymers from mixtures of tertiary mono-olefins and diolefins at subatmospheric temperatures.

Prior to the present invention it has been known to polymerize a mono-olefin such as isobutylene and a diolefin such as isoprene at a low temperature in the range from about −120° to about −175° F. This process is being employed on a commercial basis and has resulted in the production of large quantities of rubber which is suitable for manufacture of inner tubes. The process entails forming a feed stock consisting of isobutylene, isoprene, and a diluent for the reaction such as methyl chloride and chilling the mixture to a temperature in the range given, usually about −140° F. To this mixture is added a solution of aluminum chloride, for example, in methyl chloride to cause polymerization. It is customary to remove the heat of reaction resulting from the polymerization of the tertiary olefins with the diolefins by suitable refrigeration of the feed stock, the catalytic solution, and the reacting mass. The polymer forms as a slurry of crumbs of rubber particles in the diluent for the reaction and is withdrawn from the reaction scene for recovery of the rubbery material. It is customary to dump the slurry of rubbery particles into a body of hot water to cause removal of unreacted hydrocarbons and diluent by vaporization thereof.

It has also been taught to carry out such reactions conducting the polymerization in space. Such a process is taught in the patent to H. D. Wilde, U. S. 2,405,480, entitled "Polymerization Process" which issued August 6, 1946. In this process the feed mixture including iso-olefins, di-olefins, and methyl chloride is, after refrigeration, admixed in space with a solution of aluminum chloride in methyl chloride and the resulting polymer collected on a hot, rotating drum which causes vaporization of the unreacted hydrocarbons which are recovered by suitable provisions.

It has also been taught to carry out a reaction similar to that disclosed in the Wilde patent with the substantial exclusion of diluent for the reaction; only the diluent required to dissolve the catalyst is used. Such a process is described and claimed in U. S. 2,434,582 which issued January 13, 1948, to R. F. Pfennig and M. H. Gertz.

In all of the prior art processes it has been nec-

2 essary to provide refrigeration facilities or to chill the feed hydrocarbon to a low temperature to compensate for the heat liberated by the polymerization reaction. Thus, in the commercial process the reactants are refrigerated to remove heat of reaction. In the afore-mentioned Wilde patent, the heat of reaction is partially compensated for by the refrigeration of the components of the feed mixture. In the aforesaid Pfennig et al. patent, no compensation is made for the heat of reaction except by chilling the reactants to a low temperature, the idea being to eliminate the methyl halide in view of its poisonous nature.

In the present invention, it is also desired to eliminate substantially the diluent for the reaction, but, unlike the prior art, it is proposed to privide for substantial elimination of the heat of reaction by taking advantage of the latent heat of vaporization of a portion of the feed hydrocarbons. The prior art methods did not take advantage of the latent heat of vaporization of the reacting hydrocarbons and have no teaching of using substantially the latent heat of vaporization for removal of heat of polymerization.

It is, therefore, the main object of the present invention to provide a process for the polymerization of olefins at subatmospheric temperatures under conditions at which the heat of polymerization is substantially removed by the latent heat of vaporization of at least a portion of the feed hydrocarbons.

Another object of the present invention is to provide a method for reacting a feed mixture of mono-olefins and diolefins to form a vulcanizable product in which the heat of reaction is removed by substantially vaporizing the unreacted hydrocarbons during polymerization thereof.

A still further object of the present invention is to conduct a polymerization reaction including mono-olefins and diolefins in space at a subatmospheric temperature and a subatmospheric pressure so that the heat liberated during the polymerization reaction is substantially compensated for by the latent heat of vaporization of unreacted hydrocarbons.

The objects of the present invention may be achieved by polymerizing a mono-olefin or a mixture of a tertiary mono-olefin and a diolefin at a low temperature of the order of −120° to −175° F. in the substantial absence of a diluent for the reaction and at a low pressure preferably below 1 pound per square inch absolute so that the heat liberated by the polymerization reaction in this temperature range is substantially compensated for by the latent heat of vaporization of the hydrocarbons that are not polymerized.

Briefly then, the present invention may be described as involving the formation of a liquid stream including a tertiary mono-olefin such as isobutylene and a diolefin such as isoprene. This stream is chilled to a temperature in the range between −120° and −175° F. and maintained at a superatmospheric pressure such as about 50 pounds per square inch gauge. A catalytic solution is then formed by dissolving a Friedel-Crafts catalyst such as aluminum chloride in an alkyl halide such as methyl chloride and the catalytic solution in turn is chilled to a temperature in the range given and maintained at a pressure no less than about 50 pounds per square inch gauge. The feed mixture and the catalytic solution are then admixed suddenly in a zone where the pressure is reduced to a point no greater than about 1 pound per square inch absolute such that the enormous amount of heat liberated in the reaction is substantially absorbed by the latent heat of vaporization of the hydrocarbons present in the stream that are not reacted. Preferably the reaction is carried out in space resulting in the formation of a stream of semi-solid particles which is allowed to fall on a surface such as that described in the aforementioned Wilde patent or on an extruder to cause removal of the product from the reaction scene. In this particular instance, it will be seen that the present invention differs from the prior art processes in that the heat of polymerization is substantially removed by the latent heat of vaporization of the hydrocarbons by providing a low pressure reaction zone where the polymerization takes place.

The invention is broadly applicable to the low temperature polymerization of mono-olefins to high molecular weight products. For example, it may be employed in polymerizing a tertiary mono-olefin to a high molecular weight product. Such polymerization may be conducted at a temperature from −50° to −175° F. However, the invention has particular application to the polymerization of mixtures of tertiary mono-olefins and diolefins to form high molecular weight products having vulcanizable characteristics.

As examples of the tertiary mono-olefins suitable as feed stocks in the present invention may be mentioned isobutylene, isopentylene, isohexylene, isoheptylene and iso-octylene, while, besides isoprene as the diolefin, may be mentioned butadiene, butadiene-1,3, the conjugated pentadienes, hexadiene, heptadienes, and the octadienes. However, it will be understood that isobutylene and isoprene will constitute the preferred feed mixture.

As mentioned before, temperatures in the range of from −50° to −175° F. may be employed when a mono-olefin is the feed stock. However, when a mixture of a tertiary mono-olefin and a diolefin constitute the feed mixture, preferred temperatures in the range between −120° and −175° F. should be employed to produce vulcanizable products. Temperatures from −130° to −150° F. give best results.

The relative amounts of tertiary mono-olefin to isoprene may vary widely depending on the characteristics of the product desired. Ordinarily, isobutylene will constitute a major amount of the feed mixture and isoprene a minor amount. For example, isobutylene may constitute about 98 parts of the feed mixture and isoprene about 2 parts. However, the diolefin may be used in other proportions. For example, the weight percentage of the diolefin may vary from about 1% up to about 25% of the feed mixture with the tertiary mono-olefin constituting the remainder.

The Friedel-Crafts catalyst employed in the practice of the present invention may be any of the well known Friedel-Crafts catalysts. For example, aluminum chloride, titanium tetrachloride, boron trifluoride, zirconium chloride, ferric chloride, and the like may be employed. Similarly, other solvents besides methyl chloride may be employed as, for example, carbon disulfide, carbon tetrachloride, ethyl chloride, and other alkyl halides. The solvent for the catalyst should have the property of dissolving the Friedel-Crafts catalyst without forming complexes therewith and must be unreactive with the hydrocarbon reactants.

The concentration of Friedel-Crafts catalyst, for example aluminum chloride, in the solvent, such as methyl chloride, may vary over a wide range. For example, from about 0.05 gram of aluminum chloride per 100 milliliters of solution to about 0.5 gram aluminum chloride per 100 milliliters of solution may be used. Ordinarily, the solution employed to catalyze the reaction will not contain more than 0.1 gram of aluminum chloride per 100 milliliters of methyl chloride solution. The amount of aluminum chloride solution employed to catalyze the reaction is very small and may vary from about 0.025 to about 0.10 volume per volume of hydrocarbon feed. It will thus be seen that the actual amount of solvent in the reacting mass is very small, and, therefore, substantially all of the heat of reaction is removed by the latent heat of vaporization of the hydrocarbons themselves.

As mentioned before, temperatures in the range from about −120° to about −175° F. should be employed. Pressures to be used in the reaction zone should be no greater than about 1 pound per square inch absolute while the pressure from which the hydrocarbon mixture and the catalyst solution is reduced should be about 50 pounds to provide substantial vaporization of the hydrocarbons to remove substantially the heat of polymerization. The heat of polymerization of isobutylene and isoprene is about 360 to about 380 B. t. u.'s per pound of polymer produced. Thus, by reducing the pressure in the reaction zone, it is possible to conduct a polymerization reaction at −150° F. and to remove the heat of reaction by maintaining the vapor pressure of the hydrocarbons at about 5 millimeters Hg. absolute. Thus, in effect, by reducing the pressure in the zone in which the polymerization reaction takes place, it is possible to remove substantially the heat of reaction.

The invention will be described further by reference to the drawing in which the single figure is a front elevation in partial section of apparatus suitable for conducting one mode of the invention.

Referring now to the drawing, numeral 11 designates a feed line through which a substantially purified stream of isobutylene is introduced into a mixing chamber 12. Numeral 13 designates a charge line through which substantially purified isoprene is introduced into chamber 12 for admixture with the isobutylene. For purpose of illustration, it is assumed that the isobutylene consists of 98% of the mixture and isoprene about 2% of the mixture. This feed mixture of hydrocarbons is withdrawn from chamber 12 by line 14 and passed through a cooling zone 15 provided with cooling means, not shown, wherein its temperature is reduced to about −150° F.

There is also provided a mixing chamber 16 wherein a catalytic solution of aluminum chloride in methyl chloride is formed, the aluminum chloride being introduced into mixing chamber 16 by line 17 and the methyl chloride is introduced thereto by line 18. The catalytic solution is withdrawn from chamber 16 by line 19 and passed through a cooling zone 20 which is similar to cooling zone 15 wherein the temperature of the catalytic solution is reduced to about −130° F. by means not shown. The chilled feed mixture is withdrawn from cooling zone 15 by line 21 containing pump 22 which raises the pressure of the feed mixture to about 50 pounds per square inch gauge. The catalytic solution is withdrawn from cooling zone 20 by line 23 containing pump 24 which also raises the pressure of the chilled catalytic solution to about 50 pounds per square inch gauge. The pumps 22 and 24 impose sufficient pressure to force the feed mixture and the catalytic solution through lines 21 and 23.

Jet member 25 is located in a chamber 26. The jet 25 is in fluid communication with the catalytic solution flowing through line 23 while the annulus defined by the outer surface of jet 25 and the inner surface of chamber 26 is in communication with the hydrocarbon feed flowing through line 21. Thus, in effect, the feed flows into the aforementioned space and the catalyst flows through the aforementioned jet member and both admix in zone 27 maintained at a relatively low pressure no greater than about 1 pound per square inch absolute. The catalytic solution flows through a nozzle 28 while the hydrocarbon feed mixture flows through an orifice surrounding the jet member 25 which is indicated by the numeral 29. It will be seen that the jet member 25 projects below the chamber 26 into the zone 27 as has been described. Zone 27 is defined by a chamber 30 which is provided with an outlet line 31 which will be described further and a lower section thereof 32 containing a moving surface such as a mechanical extruder which is actuated through a shaft 34 by a means not shown.

The catalytic solution and the feed mixture debouch into zone 27 which is maintained at a pressure below 1 pound per square inch absolute. The catalytic solution and hydrocarbon admix in stream 35 and nearly immediately react to form a polymer which may be in the form of a viscous, plastic mass which drops down onto the moving surface defined by extruder 33. The large drop in pressure from a superatmospheric pressure, such as for example 50 pounds per square inch gauge, to no more than 1 pound per square inch absolute at the desired reaction temperature causes substantial vaporization of unreacted hydrocarbons, the latent heat of vaporization of which is sufficient to remove substantially all of the heat of polymerization of the hydrocarbon feed mixture and thus serves to maintain a temperature in the range from about −140° to about −150° F. in zone 27 allowing the control of the polymerization reaction which heretofore was attained only by refrigeration.

The vaporized hydrocarbons are withdrawn from chamber 30 by line 31, the low pressure being maintained in zone 27 by compressor 36 located in line 31. The compressed hydrocarbons containing a small amount of methyl chloride from the catalytic solution are discharged thereby into a distillation tower 37 which is provided with a temperature and pressure adjustment means, not shown. Tower 37 is adjusted to remove overhead by line 38 any methyl chloride contained in the stream withdrawn by line 31 and to remove by line 39 unreacted isobutylene and isoprene which may be recycled to the process as desired.

The polymer substantially free of unreacted hydrocarbons by virtue of the reduced pressure maintained in zone 27 falls in stream 35 onto extruder 33 which forces the mass of polymer through an orifice 40 and thence through a suitable conduit 41 and by deflecting plate 42 onto a conveyor 43 which is actuated by rollers 44. Conveyor 43 may be an endless belt which serves to move the jet of polymer 45 to suitable milling and processing devices, not shown. Deflecting plate 42 may have sprayed thereon a suitable antitack liquid to prevent adherence of the polymer thereto and to the surface of conveyor 43. Such anti-tack material may include corn oil, castor oil, and zinc stearate suspension, and it may be introduced thereto by means of a spray 46 which is connected to a suitable source of anti-tack agent, not shown, through pipe 47.

It will be seen from the foregoing description taken with the drawing that both the feed mixture and the catalytic solution are maintained at a low temperature and at a pressure above the vapor pressure of the hydrocarbon mixture and that the two of them are admixed while maintaining the relatively low temperature and suddenly reducing the pressure to 1 pound per square inch absolute or lower. This expedient takes advantage of the heat of vaporization of the hydrocarbons and serves to compensate for the enormous heat of polymerization of the hydrocarbons, allowing the reaction to be conducted at a specified and substantially constant temperature in the substantial absence of a diluent for the reaction and a refrigerant, the only refrigeration being necessary is that employed initially to reduce the temperature of the feed mixture and the catalytic solution.

It will be appreciated that the invention is not limited to the specific mode or to the specific apparatus employed. For example, the apparatus described in the aforementioned patent to H. D. Wilde may be used with suitable modifications. Similarly, that described in the patent to Pfennig and Gertz may be also employed in conducting my invention. The semi-batch reactor employed in commercial operations may also be adapted to the process of the present invention provided suitable provision is made for reducing suddenly the pressure of the reactants entering into the reaction zone.

While my invention has been described with relation to maintaining the pressure of the feed mixture and the catalytic solution at about 50 pounds per square inch gauge, it will be understood that higher and lower pressures than 50 pounds per square inch gauge may be used as long as the pressure is sufficient to maintain the hydrocarbons in a liquid phase. For example, pressure up to 500 pounds may be employed. Similarly, pressures no greater than 1 pound per square inch absolute are recited for the reaction zone 27. Ordinarily, pressures in this zone may be as low as 0.2 pound per square inch absolute. Actually the pressure will depend on the temperature at which the reaction should be conducted and the pressure should be sufficient to maintain a temperature, say for example of −140° to −150°

F., while polymerizing the hydrocarbons, removing the unreacted hydrocarbons, and removing the heat of polymerization which is about 360 to about 380 B. t. u.'s per pound of polymer produced at a temperature in the range given.

The nature and objects of the present invention, having been completely described and illustrated, what I wish to claim as new and useful and to secure by Letters Patent is:

1. A method for producing a rubbery polymer which comprises forming a feed mixture consisting of tertiary mono-olefin and a diolefin, said mono-olefin and diolefin having from 4 to 8 carbon atoms in the molecule, chilling said feed mixture to a temperature in the range between $-120°$ and $-175°$ F., forming a catalytic solution of a Friedel-Crafts catalyst in a solvent therefor which does not form complexes therewith and is unreactive with said mono-olefin and diolefin, chilling said solution to a temperature in the range between $-120°$ and $-175°$ F., maintaining said feed mixture and said catalyst solution at a superatmospheric pressure, admixing said chilled feed mixture with an amount of catalyst solution in the range between 0.025 and 0.10 volume per volume of feed at a pressure no greater than 1 pound per square inch absolute and at a temperature in the range between $-120°$ and $-175°$ F. to cause substantial polymerization of said feed mixture to form a product and substantial vaporization of unreacted hydrocarbons, removing heat of said polymerization reaction by the latent heat of vaporization of said unreacted hydrocarbons, and recovering said product.

2. A method in accordance with claim 1 in which the tertiary mono-olefin is isobutylene, the diolefin is isoprene, and the Friedel-Crafts catalyst is aluminum chloride.

3. A method for producing a rubbery polymer which comprises forming a feed mixture consisting of tertiary mono-olefin and diolefin, said mono-olefin and diolefin having from 4 to 8 carbon atoms in the molecule, chilling said feed mixture to a temperature in the range between $-120°$ and $-175°$ F., forming a catalytic solution of a Friedel-Crafts catalyst dissolved in an alkyl halide solvent without forming complexes therewith and which is unreactive with said mono-olefin and diolefin, chilling said catalytic solution to a temperature of the order of $-120°$ to $-175°$ F., maintaining said feed mixture and said catalytic solution at a superatmospheric pressure, admixing said chilled feed mixture with an amount of said chilled catalytic solution in the range between 0.025 and 0.10 volume per volume of feed in space at a temperature in the range between $-120°$ and $-175°$ F. while suddenly reducing the pressure of said feed mixture and said catalyst solution to a pressure no greater than 1 pound per square inch absolute to cause substantial polymerization of said feed mixture to form a product and substantial vaporization of unreacted hydrocarbons in said product, depositing said product on a moving surface, and recovering said product from said surface.

4. A method in accordance with claim 3 in which the tertiary mono-olefin is isobutylene, the diolefin is isoprene, and the Friedel-Crafts catalyst is aluminum chloride.

5. A method for producing a rubbery polymer which comprises forming a feed mixture consisting of isobutylene and isoprene, chilling said feed mixture to a temperature of the order of $-150°$ F., forming a catalytic solution of aluminum chloride in methyl chloride, chilling said catalytic solution to a temperature of the order of $-130°$ F., maintaining said feed mixture and said catalytic solution at a pressure of the order of 50 pounds per square inch gauge, admixing said chilled feed mixture with an amount of said chilled catalytic solution in the range between 0.025 and 0.10 volume per volume of feed in space at a temperature in the range between $-140°$ to $-150°$ F. while suddenly reducing the pressure of said feed mixture and said catalyst solution to a pressure of the order of 0.2 pound per square inch absolute to cause substantial polymerization of said feed mixture to form a product and substantial vaporization of unreacted hydrocarbons in said product, depositing said product on a moving surface, and recovering said product from said surface.

6. A method for producing a rubbery polymer which comprises forming a feed mixture consisting of a tertiary mono-olefin and a diolefin, said mono-olefin and diolefin having from 4 to 8 carbon atoms in the molecule, chilling said feed mixture to a temperature in the range between $-120°$ and $-175°$ F., forming a catalytic solution of a Friedel-Crafts catalyst in a solvent therefor without forming complexes with said catalyst and which is unreactive with said mono-olefin and diolefin, chilling said solution to a temperature in the range between $-120°$ and $-175°$ F., maintaining said feed mixture and said catalytic solution at a superatmospheric pressure, admixing said chilled feed mixture with an amount of catalytic solution in the range between 0.025 and 0.10 volume per volume of feed in a zone maintained at a subatmospheric pressure no greater than 1 pound per square inch absolute and sufficient to maintain a temperature therein in the range between $-120°$ and $-175°$ F. to cause substantial polymerization of said feed mixture to form a product and substantial vaporization of unreacted hydrocarbons, removing heat of said polymerization reaction by the latent heat of vaporization of said hydrocarbons, and recovering said product.

7. A method in accordance with claim 6 in which the tertiary mono-olefin is isobutylene, the diolefin is isoprene, and the Friedel-Crafts catalyst is aluminum chloride.

8. A method in accordance with claim 6 in which the superatmospheric pressure is approximately 50 pounds per square inch gauge.

JOHN M. POWERS.

REFERENCES CITED

The following references are of record in the file of this patent:

UNITED STATES PATENTS

| Number | Name | Date |
|---|---|---|
| Re. 22,210 | De Simo | Oct. 27, 1942 |